United States Patent [19]
Visser

[11] 3,827,743
[45] Aug. 6, 1974

[54] LOAD HANDLING APPARATUS
[75] Inventor: Peter J. Visser, Niles, Mich.
[73] Assignee: Clark Equipment Company, Buchanan, Mich.
[22] Filed: June 30, 1972
[21] Appl. No.: 267,747

[52] U.S. Cl......... 294/67 BB, 214/77 R, 214/147 G, 212/46 R, 212/144, 294/67 DA, 294/81 SF
[51] Int. Cl............................................. B60p 1/48
[58] Field of Search............ 294/67 R, 67 B, 67 BC, 294/67 D, 67 DA, 67 DB, 67 DC, 81 SF, 67 BB; 214/77 R, 620, 621

[56] References Cited
UNITED STATES PATENTS

| | | | |
|---|---|---|---|
| 2,904,370 | 9/1959 | Meinholtz et al. | 294/67 BC X |
| 3,161,309 | 12/1964 | Baudhuin et al. | 294/67 BC X |
| 3,251,496 | 5/1966 | Lamer et al. | 294/67 BC X |
| 3,448,874 | 6/1969 | Martinson | 214/77 R X |
| 3,458,229 | 7/1969 | Nagy et al. | 294/67 BC |
| 3,558,172 | 1/1971 | Lamer et al. | 294/67 BC |
| 3,558,176 | 1/1971 | Fathauer et al. | 294/67 BC |
| 3,589,540 | 6/1971 | Kinross | 214/621 |
| 3,606,053 | 9/1971 | Whiteman | 294/81 SF X |
| 3,726,421 | 4/1973 | Goldhofer | 214/77 R |

Primary Examiner—Robert J. Spar
Attorney, Agent, or Firm—Kenneth C. Witt

[57] ABSTRACT

A load handling apparatus, which may form a part of a load transfer machine for handling semi-trailers, cargo containers and other large loads. The load handling apparatus includes a load handling device and an associated mechanism which are readily collapsible by remote control to dimensions sufficiently small that the load transfer machine may be mounted on a semi-trailer or other vehicle for movement over public highways. At the same time, the load handling apparatus is readily erectable, also by remote control, so that it may be quickly prepared for the handling of large loads.

12 Claims, 19 Drawing Figures

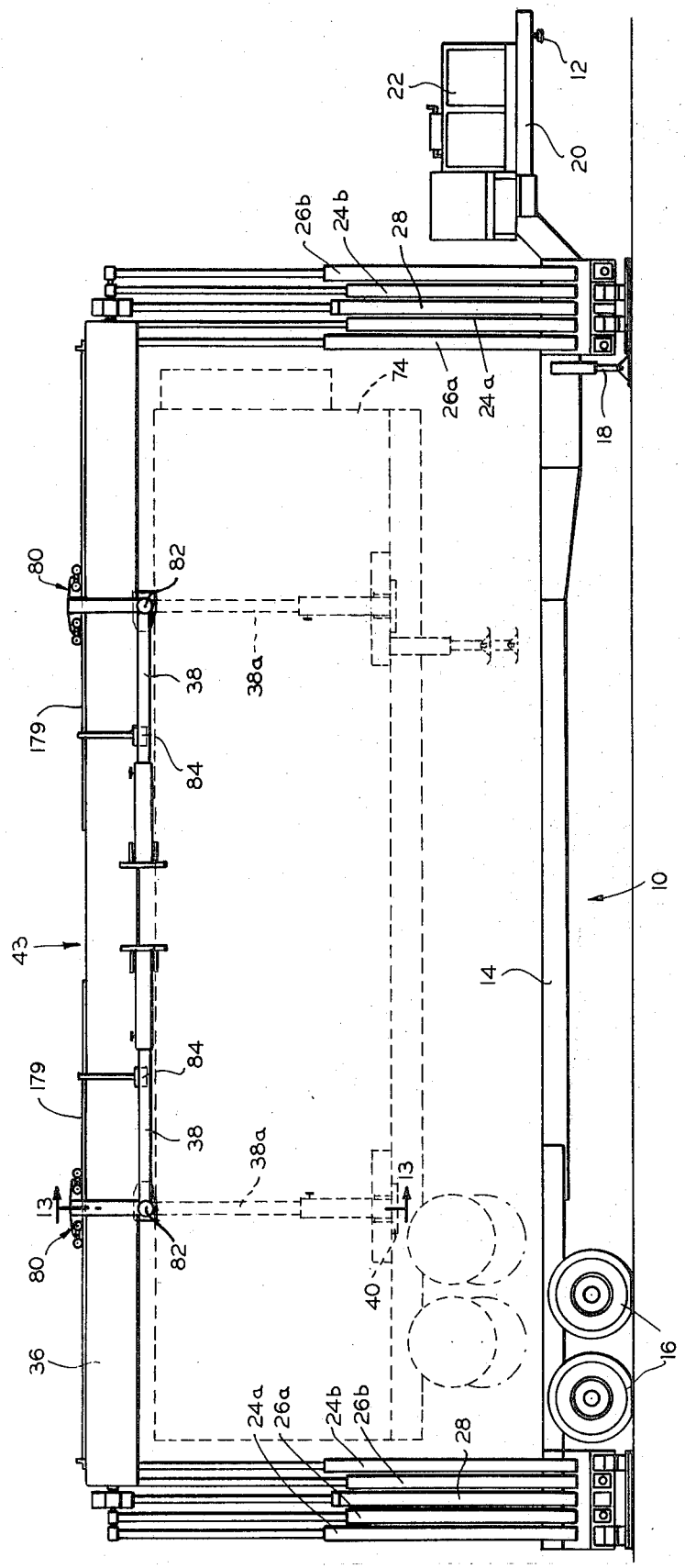

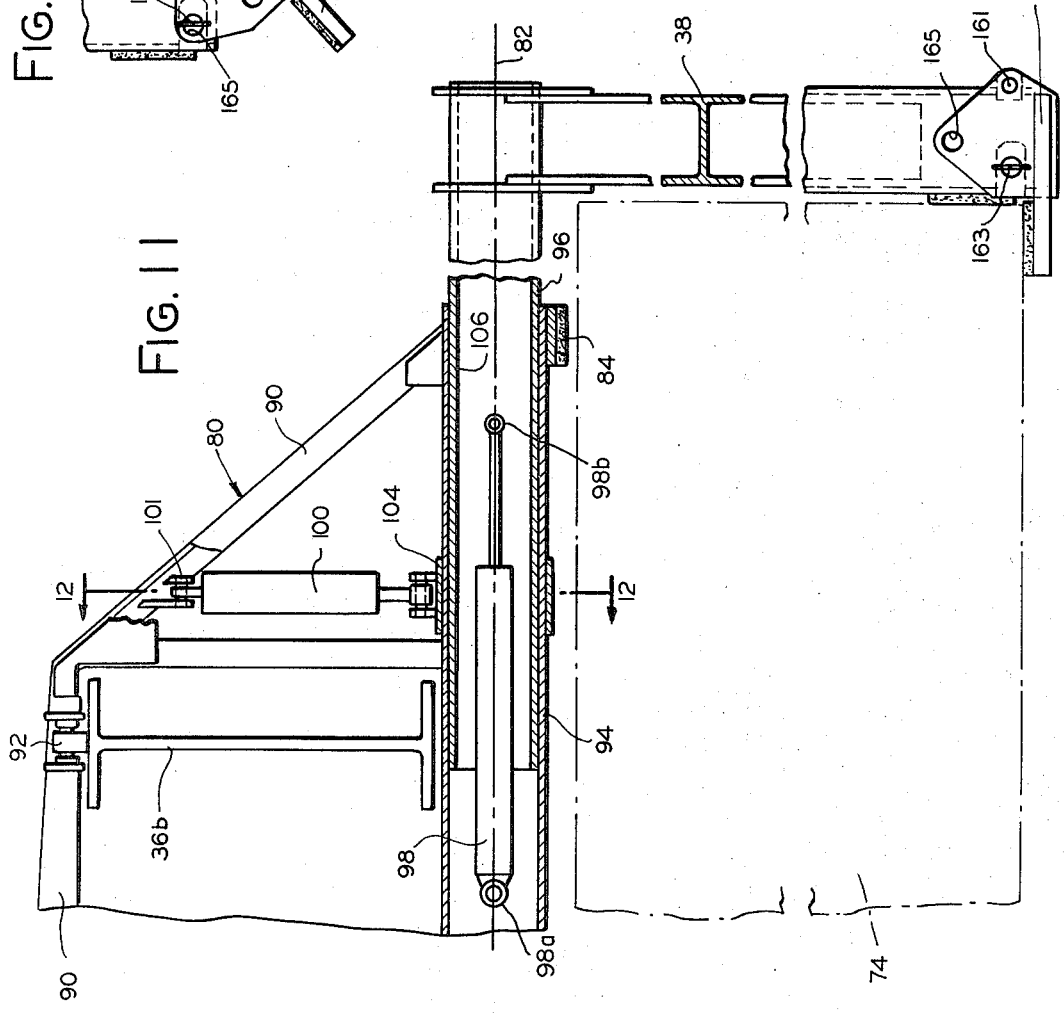

3,827,743

LOAD HANDLING APPARATUS

CROSS REFERENCE

The load handling apparatus of the present invention may be utilized advantageously with the load transfer machine which is the subject of U.S. patent application Ser. No. 187,362, filed Oct. 7, 1971, now U.S. Pat. No. 3,718,221, dated Feb. 27, 1973, however, the present invention is not limited to use with that particular load transfer machine.

BACKGROUND OF THE INVENTION

1. Field of the Invention

This invention relates to load handling devices and mechanisms which may be incorporated in load transfer machines for loading and unloading trailers, semi-trailers and containers onto or off of railroad cars, for handling housing modules, and other large loads. This invention is particularly useful in load transfer machines which are mobile or portable so that they may be moved from place to place as needed.

2. Description of the Prior Art

Many of the prior art machines for handling large loads of the types mentioned are themselves so large that they are restricted to operation in a single area, if indeed they are movable at all; and many are of the stationary type. For example, gantry type machines are frequently used in the transfer of loads onto and off of railroad cars, and such gantry machines are large enough that they can straddle the railroad car and a highway vehicle beside the track, and at the same time are high enough to be able to lift the load and transfer it between two locations.

Machines have been disclosed previously which attempt to provide in various ways—including the retraction and collapsing of portions in some cases—load transfer machines which can be made movable so that it is possible to move them readily from one location to another. The object of the present invention is to provide a load handling apparatus for a machine of the type mentioned which enables the machine to be mounted on a semi-trailer or other conveyance, and when it is so mounted, enables it to be readily collapsed to a configuration which permits it to be within the allowable limits for transport over public highways and which also enables it to be readily erected again for operation at the loading site.

SUMMARY OF THE INVENTION

In carrying out this invention in one preferred form, a load handling apparatus is provided which includes a load handling device having a pair of transverse support structures carried by an elongated beam member. Two pairs of horizontally disposed tubular members extend laterally respectively from the opposite sides of the support structures. Means are provided for moving the tubular members outwardly and inwardly. Additional means are provided, connected between the support structures and each of the tubular members respectively, for pivoting the tubular members about their respective axes, and load engaging arms are connected at the outer ends of the tubular members. The load handling device may be mounted on a collapsible boom arm mechanism.

BRIEF DESCRIPTION OF THE DRAWING

FIG. 4 is a side elevation of the load transfer machine with the load handling apparatus still partially in the collapsed condition, with another condition indicated in dashed lines;

FIG. 11 is an enlarged fragmentary sectional view showing the portion indicated in dashed lines in FIG. 8;

FIG. 11A is a fragmentary view of the shoe portion of FIG. 11 showing the shoe in a different position;

FIG. 12 is a sectional view along the line 12—12 of FIG. 11;

FIG. 12A is a view along the line 12A—12A of FIG. 12;

Figure 1:
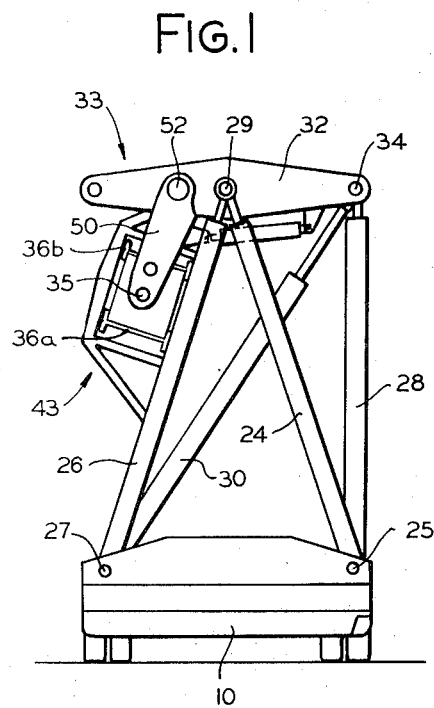
FIG. 1 is an end elevation of a load transfer machine embodying the load handling apparatus, including the load handling device and the associated collapsible boom arm mechanism of the present invention, in the collapsed condition.

All of the figures of the drawing are partially schematic.

DESCRIPTION OF THE PREFERRED EMBODIMENT

Referring first to FIG. 1 of the drawing, some of the basic parts of a typical load transfer machine are shown schematically. In FIG. 1 and other figures, the base of the transfer machine is shown as a semi-trailer indicated by the numeral 10 which can be readily moved from one location to another by coupling a suitable tractor to the kingpin indicated at 12 (in FIG. 4).

Referring to FIG. 4, the semi-trailer illustrated has a suitable intermediate structural portion indicated at 14, wheels 16 at the rear and landing gear 18 at the front to support the front end of the semi-trailer after the tractor vehicle which moved it is detached. The semi-trailer illustrated also has a goose neck portion 20 upon which is mounted in the enclosure 22 an engine which provides the power to operate the various actuators to be described. In this typical machine the engine drives a hydraulic pump (not shown) which supplies pressurized fluid for operating the various actuators. It will be appreciated also from the subsequent description that the portion of the semi-trailer which supports the load handling apparatus and mechanism of the present invention is generally rectangular in configuration, that is, the various supports for the load handling apparatus are connected adjacent the four corners in a rectangular arrangement.

Referring to FIG. 1, the numerals 24 and 26 indicate respectively a pair of extensible and retractable linear actuators which provide a portion of the support for the load handling apparatus of the present invention and which are hereinafter referred to as the main supports. As illustrated, the main supports are expansible chamber hydraulic devices. Main supports 24 and 26 are pivoted on the base 10 at their lower ends about axes 25 and 27 as indicated. Actually, both supports 24 and 26 are double and include two actuators each in the embodiment described and illustrated herein and this may be seen by reference to FIG. 4 in which the two actuators which comprise main support 24 are indicated by the numerals 24a and 24b, while the two actuators which comprise main support 26 are indicated at 26a and 26b. Moreover, it will be observed that the arrangement just described is duplicated at the opposite end of the base 10 except that 26a and 26b are outside of 24a and 24b instead of vice versa. This imparts additional longitudinal strain resistance to the complete machine. In order to simplify the description, the main supports will be referred to herein as if they were single instead of double.

Still referring to FIGS. 1 and 4, there is also a pair of auxiliary supports or guides indicated respectively by the numerals 28 and 30. The lower end of support 28 is pivoted about the same axis as main support 24 in the construction illustrated, while the lower end of support 30 is pivoted about the same axis as main support 26. The auxiliary supports are duplicated at the opposite end of the base 10. Auxiliary supports 28 and 30 are shown herein as piston and cylinder type expansible chamber hydraulic devices, but it will be appreciated that other equivalent supports or guides may be used if desired.

The upper ends of main supports 24 and 26 at both ends of the load transfer mechanism are pivotally connected at intermediate locations 29 to a transverse boom arm 32 which is horizontally disposed in the collapsed position shown in FIG. 1 and forms a portion of a collapsible boom arm mechanism indicated generally by the numeral 33. The upper ends of auxiliary supports 28 and 30 are pivotally connected about a common axis 34 adjacent one end of the boom arm, and this applies at both ends of the load transfer machine. The other ends of the boom arms in the embodiment shown support between them a load handling device 43 (see FIGS. 4 and other figures) pivotable about a pivot axis 35 (see FIG. 2) in the erected position. Load handling device 43 comprises a longitudinal beam structure 36 (see FIG. 4) which supports lift arm 38, the structure and operation of which are described in greater detail hereinafter.

Figure 2:
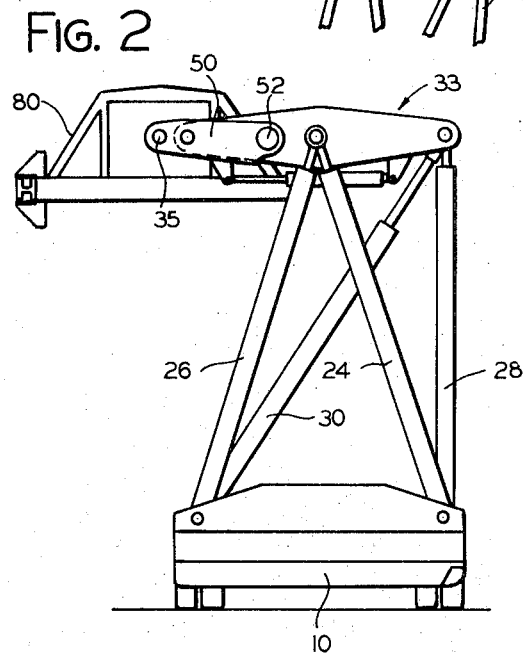
FIG. 2 is a similar view except showing the partially erected condition.

FIG. 2 of the drawing is a view showing the load handling apparatus and mechanism partially erected to prepare for a handling operation in that the collapsible mechanism 33 has been moved from the position of FIG. 1 to the horizontally disposed position of FIG. 2. This is accomplished by pivoting an auxiliary boom arm 50 about a pivot axis 52, it being understood that in the embodiment shown there is auxiliary boom arm 50 at each end of the load transfer machine. In FIG. 1, the auxiliary boom arm 50 is in a downwardly extending position in which the main members 36a and 36b (which are embodied in beam 36) of the load handling apparatus 43 abut and rest against main support 26 at one end and support 24 at the other end, and in FIG. 2 it has been pivoted to a horizontal position and secured to main boom arm 32 in order to provide in effect an extension of the main boom arm.

Figure 5:
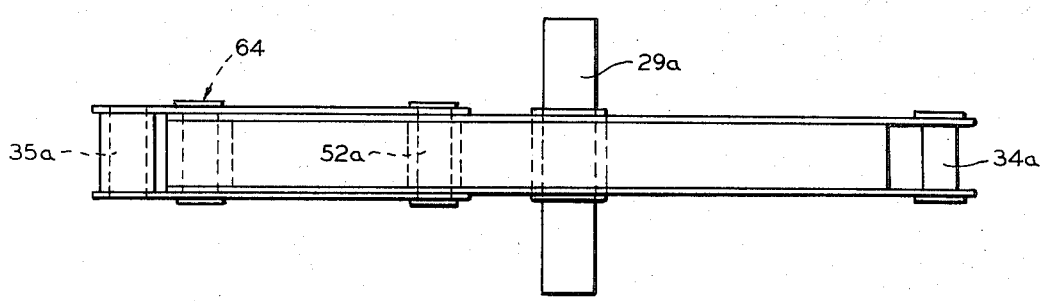
FIG. 5 is a top plan view showing a main and auxiliary boom arm and related parts.
Figure 6:
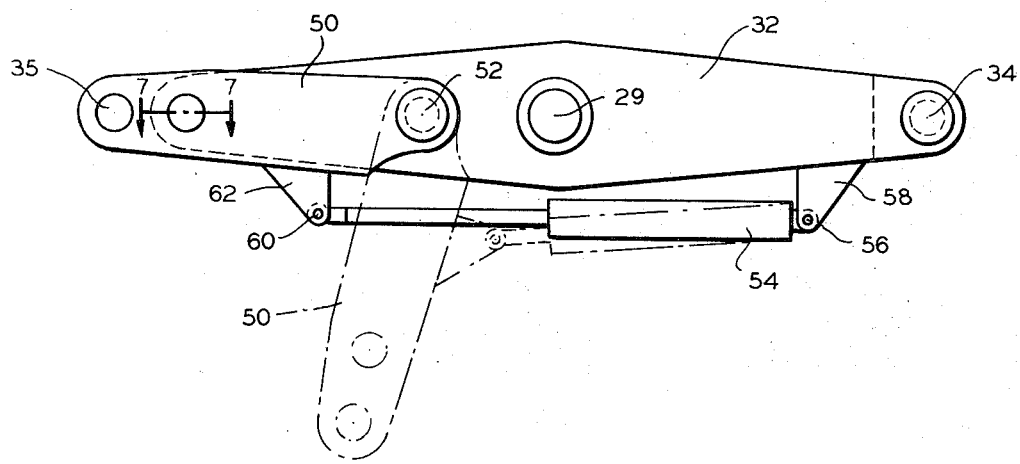
FIG. 6 is a side elevation showing the main and auxiliary boom arm and related parts.

FIGS. 5, 6, 7 and 7A show more details of the main and auxiliary boom arms, including the manner in which they are secured together in the operating position. In FIG. 6, the auxiliary boom arm 50 is shown in dashed lines in a depending position which corresponds to FIG. 1 and in solid lines in the operating position which corresponds to FIG. 2. Auxiliary boom arm 50 is pivoted between the said two positions by means of an actuator 54 which may be of the expansible chamber, piston and cylinder hydraulic type, the actuator being pivotally connected at 56 to a bracket 58 on the main boom and also pivotally connected to the auxiliary boom arm at 60 by means of a bracket 62. In FIG. 5, the various pivot shafts, pins and bearing surfaces are identified by the same numerals as the pivot axes in FIG. 6 with the addition of the letter a in each case to indicate the respective shaft, pin or bearing surface. FIG. 5 also indicates the location of the latch mechanism 64 which secures the auxiliary boom arm to the main boom arm in the operating position.

Figure 7:
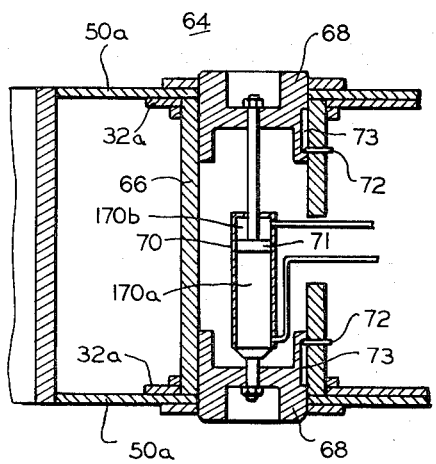
FIG. 7 is a fragmentary sectional view along the line 7—7 of FIG. 6 showing the details of the latch for securing an auxiliary boom arm to its main boom arm.
Figure 7A:
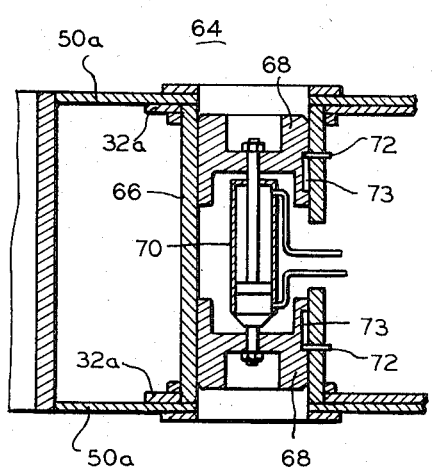
FIG. 7A is the same as FIG. 7 except showing the latch in the retracted position.

A typical latch 64 which is suitable for this purpose is shown in more detail in FIG. 7 which is a fragmentary view in section along the line 7—7 of FIG. 6. In FIG. 7, the main boom 32 is shown as comprised of a pair of spaced-apart side plate portions designated 32a and having a cylindrical member 66 secured to and extending between the two side plates. Within cylinder 66 are located a pair of latching members 68 which in the latched position shown in FIG. 7 project through aligned openings in the side plates 32a of the main boom and the side plates 50a of the auxiliary boom 50 and thus secure the main and auxiliary booms securely together. The members 68 are extended and retracted by means of a piston and cylinder type hydraulic actuator 70 which is remotely operated by the operator of the load transfer mechanism. FIG. 7A shows the latching members 68 in the retracted and unlatched position, the inward movement of the members 68 being limited by the pins 72 which project through the cylinder 66 into suitable recesses 73 in the members 68.

It will be appreciated that the latch mechanism 64 is latched by applying hydraulic pressure in chamber 170a below piston 71 to extend the actuator to the latched position indicated in FIG. 7 in which the detent members 68 latch the main and auxiliary booms together. To unlatch the mechanism, the actuator 70 is retracted by applying hydraulic pressure in chamber 170b on the rod side of piston 71 to contract the actuator to the position shown in FIG. 7A and thus retract members 68 and unlatch auxiliary boom arm 50 from main boom arm 32.

Figure 9:
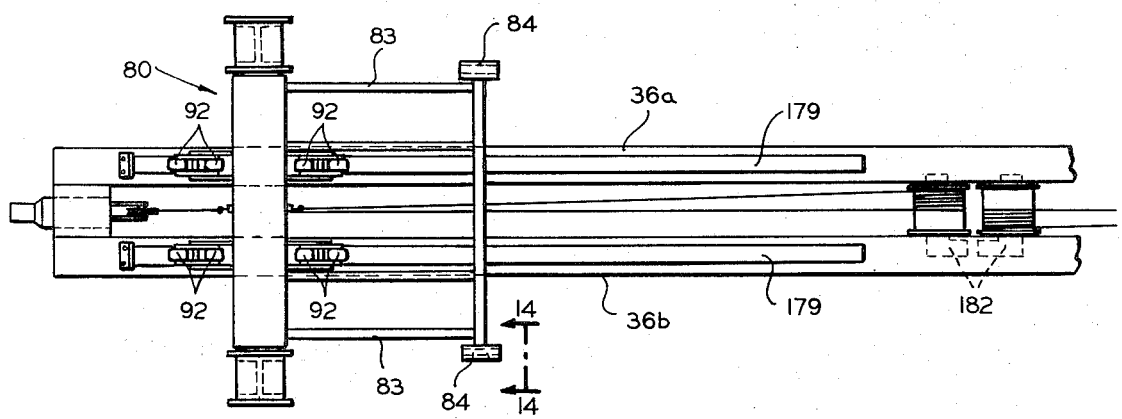
FIG. 9 is a top plan view showing a portion of the load handling apparatus.
Figure 10:
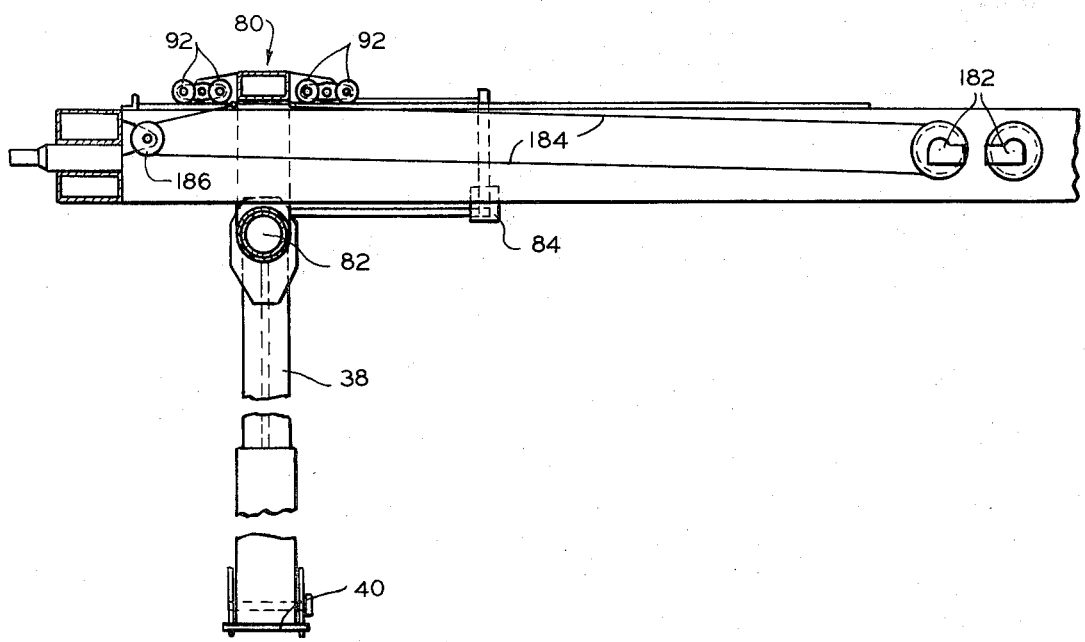
FIG. 10 is a side elevational view showing the same portion as FIG. 9 of the load handling apparatus.

As shown in FIG. 4, load handling device 43 includes carriages or support structures 80 which are adjustable longitudinally along the main beam 36 and this is illustrated in more detail by the partially schematic top plan and side elevational views of FIGS. 9 and 10, it being understood that the carriage 80 at the opposite end of the machine is an allochiral image of the structure to be described. Main beam structure 36 is indicated in FIG. 9 as comprising two I-beams which are designated respectively 36a and 36b. The carriage 80 is supported on rollers 92 which operate on tracks 179 on the upper surfaces of I-beams 36a and 36b, and the carriage 80 is moved back and forth longitudinally along the beam 36 by means of a known mechanism including a hydraulic motor at 182 which operates suitable cables 184, one of which is trained over sheave 186, to provide forward and reverse movement of the carriage 80, powered by motor 182 in a known manner.

Figure 3:
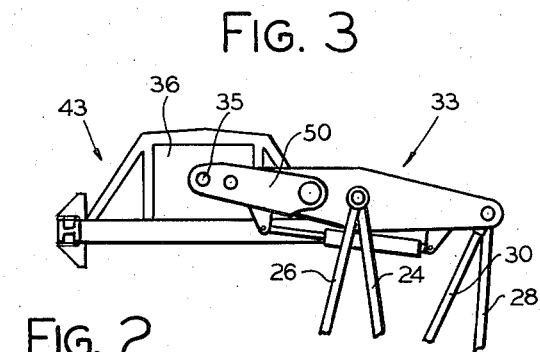
FIG. 3 is similar to FIG. 2 with the supporting actuators extended to elevate the load handling apparatus portion.
Figure 8:
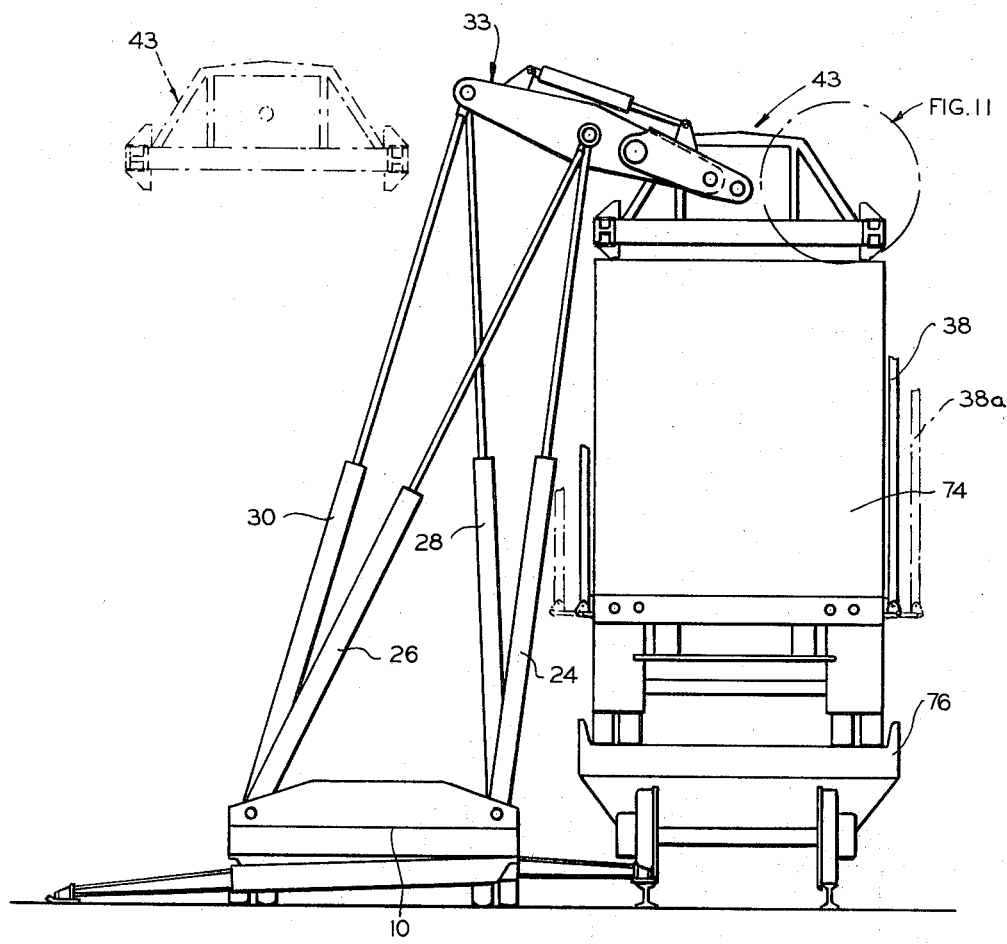
FIG. 8 is an end elevation of the load transfer machine with the load handling device in position over a semi-trailer on a railroad flatcar.

As shown in FIG. 8, the load handling device 43 has been moved from the position of FIG. 3 (which is indicated in dashed lines in FIG. 8) to a position over a load such as a semi-trailer 74 on a railroad car 76. This is accomplished by suitable manipulation of the main supports 24 and 26 and auxiliary supports of guides 28 and 30.

Next, reference is made to FIGS. 4 and 9–15 inclusive which show the details of the load handling apparatus and the manner of operation to pick up a load. The device 43, in addition to the carriages 80, includes for each carriage 80, a pair of lift arms 38 which are secured respectively at the ends of tubular members 96 (see FIG. 11). Each of the lift arms 38 is pivotable by contraction of actuator 100 by remote control about axis 82 from the solid line position shown in FIG. 4 which represents the collapsed or transport position. In such collapsed position, the arms 38 are engaged in and secured to brackets 84 which are connected to and form a part of the carriages or support structures 80 by means of intermediate frame members 83 (see FIG. 9).

In operation, after the carriages 80 have been adjusted to the desired longitudinal positions to fit load 74, the arms 38 are then pivoted downwardly to depending positions shown in dashed lines at 38a in FIG. 4. Thereafter the arms 38 are moved inwardly to engage the lift shoes 40 at the ends thereof beneath the load in order to lift it.

FIG. 11 is a fragmentary view partially in section, taken at the location indicated in FIG. 8, showing a portion of the carriage 80, and an arm 38 in the depending position. Included is a brace portion indicated generally by the numeral 90. One of the rollers 92 which operates along the top of I-beam 36b is shown in FIG. 11.

The structural portion of the carriage 80 includes a fixed transverse tube 94 (see FIG. 11). Within tube 94 which extends across the load lifting device there is located at each end a telescopic tubuar member 96 which is arranged to be moved inwardly and outwardly within tube 94, along axis 82, by means of a remotely controlled linear actuator 98. Actuator 98 is connected to fixed tube 94 at location 98a and is connected to movable tubular member 96 at location 98b. When actuator 98 is extended tube 96 carrying arm 38 at the outer end thereof is extended outwardly. When actuator 98 is retracted again tubular member 96 telescopes back within fixed tube 94. At the outer end of each tube 96 one of the lift arms 38 is securely affixed to the tube and in FIG. 11 the single arm 38 which is shown is in the depending position for lifting load 74. Also indicated in FIG. 8 in dashed lines is position 38a of the arm in which the tube 96 is extended. This is a transitory position in which the hanger arm is being prepared to enagage the load or is being removed from it.

To provide for the specified pivotal movement of arm 38 about axis 82, the tube 96 on which it is mounted is pivoted by means of a linear hydraulic actuator 100 which may be seen in FIG. 12. It is pivotally connected at the top to brace 90 to pivot about an axis 101, while at the bottom it is connected at 102 to a rotation muff 104 which in turn is operatively engaged with inner tube 96 by means of a key 98 which is secured to the muff 104. As shown in FIG. 12, the outer tube 94 has a cutout portion indicated at 106 which extends through an arc of more than 90°, and through which the key 98 projects into a longitudinal slot 99 (see FIG. 12A) in the inner tube 96. With this arrangement, circumferential movement of the muff 104 by means of the actuator 100 causes the key 98 to pivot the tube 96 about its axis, the key 96 moving through the slot or cut out portion at 106 in the outer tube 94. Pivotal movement of more than 90° as provided is adequate to enable the necessary pivotal movement of the arm between the maximum up and the maximum down position by arcuate movement of the pivot point 102 which, in turn, is produced by the extension and retraction of actuator 100. In FIG. 12 the maximum up position of the arm is indicated by the dot-dash lines at 38b and the corresponding position of the bottom pivot connection of actuator 100 is indicated at 102b. The maximum down or vertical position of the arm is indicated in dashed lines in FIG. 12 and identified by the character 38c and this corresponds to the solid line position of actuator 100 in FIG. 12.

Referring to FIG. 12A, the slot 99 extends longitudinally of the tube 96 to provide for out and in movement of the tube 96 by means of actuator 98 as previously described, independently of and without interference with the pivoting mechanism described in the preceding paragraph. During such out and in movement of the tube 96, the slot 99 moves out and in relative to the key 98.

It will be appreciated that by the use of the present load handling apparatus in conjunction with the load transfer mechanism of the copending patent referred to hereinbefore that it is possible readily to transfer a load from one side of the load transfer machine to the other, for example, from the position of FIG. 8 from which it is lifted, over to the other side of the base 10 in the manner shown in the U.S. Pat. No. 3,718,221. Likewise, a loading or unloading operation can be accomplished in the same manner in the opposite direction.

In order to prepare the present load handling apparatus and the collapsible mechanism forming a portion thereof for transfer to another location, it is necessary only to follow the reverse of the procedure which has been outlined herein. First, the arms 38 are moved outwardly away from the load and then pivoted upwardly after which they are moved inwardly and then upwardly again and latched to the brackets 84. Then, the latches 64 are operated by remote control to unlatch them in the manner explained hereinbefore and cause the auxiliary boom arms to pivot downwardly with respect to the main boom arms to restore the machine to the condition illustrated in FIG. 1, it being understood that it may be necessary also to operate the main supports 24 and 26 and auxiliary supports 28 to 30.

The load handling device 43 has been described herein in connection with the handling of a highway semi-trailer in transferring it from one location to another. However, the load handling apparatus disclosed herein also is especially adapted for handling cargo containers. Cargo containers in use in various modes of transportation commonly include on their upper corners as well as their lower corners fittings which have openings in the top or bottom surface and also on the side surface and the end surface. The present load lifting device is adaptable for handling containers which are provided with either side or end openings, or both, preferably near the top corners of the containers at both ends. To utilize the side openings, this is accomplished by means of four fittings 129 (see FIG. 15), one for each of the four arms 38, which are inserted manually when needed.

The fitting 129 illustrated is inserted in an opening 131 in arm 38, the arm 38 depicted in this figure being the left arm on the close side as seen in FIG. 4. Fitting 129 has a portion 133 which projects through opening 131 and is secured to the arm 38 in a suitable manner such as by a pin at 135 to prevent accidental dislodging of the fitting 129 during use. The inner part of the fitting 129 is provided with an upwardly projecting portion 137 which is to prevent accidental dislodging of the container in a manner which is explained subsequently.

Figure 15:
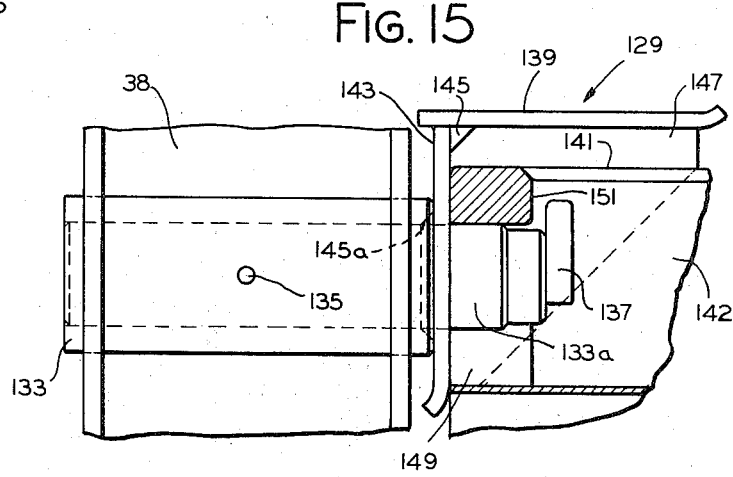
FIG. 15 is an enlarged fragmentary view along the line 15—15 of FIG. 13 showing a container lifting fitting.

The fitting 129 also includes a top plate portion 139 which engages the top 141 of the container which is indicated generally in FIG. 15 by the numeral 142. Fitting 129 also has a side guide member 143 which is rigidly secured to top guide portion 139 such as by welding at 145, as well as rigidly secured to pin portion 133a by welding at 145a at the outer surface of side member 143 where the pin 133a extends through an opening in side guide member 143. At the back of fitting 129 as seen in FIG. 15 is a gusset plate 147, which also has a guiding function as will be explained, and which is welded to top plate portion 139 and also to side guide member 143. Opening 131 (see FIG. 13 and 15) is formed by welding a tubular fitting 133 into a commensurate opening in arm 38 therewith forming proper support for the insertable fitting 129.

It will be appreciated that in order to engage fitting 129 in a side opening 149 in container 142 that arm 38 is maneuvered to first locate the fitting adjacent the opening 149 in the container in a position in which portion 137 of the fitting is outside opening 149 instead of inside as shown in FIG. 15. Top plate 139 and end gusset 147 are useful in positioning the fitting in such location ready for engagement. For example, if the fitting is reasonably close to the desired position, it is possible to lower the arm 38 until top plate 139 engages the top 141 of container. Then the arm 38 is moved forwardly until gusset 147 engages the rear surface of the container. This means that portion 137 is directly outside opening 149 and at a low enough position that it will enter such opening. Then, arm 38 is moved so that portion 137 enters opening 149 after which arm 38 is raised to move the fitting to the position shown where the container is prevented from becoming detached from the fitting 129 by portion 137 being at a higher elevation than the lower edge of portion 151 of the container.

When the fittings 129 are being used, it is necessary to pivot the lift shoes 40 at the bottom of the arms 38 out of the way so that they will not damage the side of the container, and this is accomplished in a manner indicated in FIG. 11A in which the shoe 40 is pivoted about axis 161 after withdrawing a pin 163 which normally holds the shoe 40 in the position indicated in FIG. 11, to allow the shoe to pivot to the position shown in FIG. 11A after which pin 163 is reinserted in opening 165 to hold shoe 40 in the out-of-the-way position.

Figure 4A:
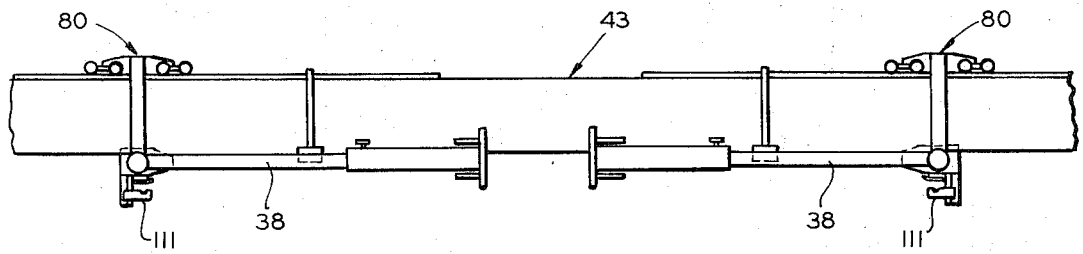
FIG. 4A is a partial view of a portion of the load transfer machine of FIG. 4 showing parts added to provide a different embodiment of the invention.

If it is desired to use the load handling device to pick up a container by means of the end openings, this can be accomplished by the use of arms 38 which are modified in accordance with the embodiment illustrated in FIG. 4A of the drawing. This figure is a fragmentary view of the upper central portion of FIG. 4 and shows in enlarged form parts which include the arms 38 in raised position. In FIG. 4A, the arms 38 are shown as equipped with hook portions 111 which are rigidly secured to and form a part of the respective arms adjacent the respective pivot axes thereof. The structure which carries the hook portion 111 projects outwardly at an angle of 90° from the longitudinal centerline of the arm 38.

It will be readily appreciated that when the lift arms are in the position of FIG. 4A and are firmly secured in such position that it is possible then to use hooks 111 to engage the end openings of containers. These hooks are optional and one of them shown in dashed lines in the larger view of FIG. 13. This is done by locating the load handling device 43 over the container to be picked up and then moving both of the carriages 80 inwardly toward the container until the four hooks 111 engage respectively the four end openings at the upper corners of the container. Thereafter the container can be lifted and transferred in the same manner as the trailer previously described herein.

Figure 13:
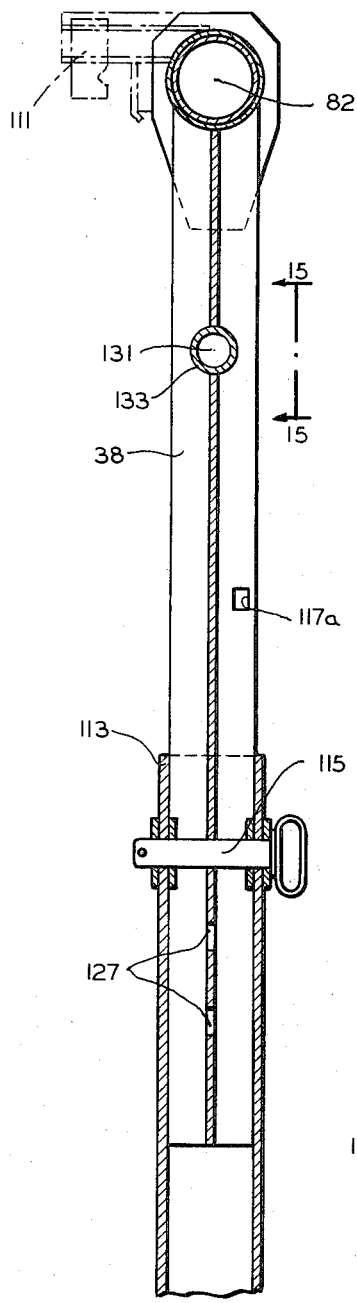
FIG. 13 is a more detailed view in section of one of the lift arms.

FIG. 13, which is partially in section, also shows an adjustable extension for the end of hanger arm 38 which is desirable in some instances. This comprises an outer extension member 113 which surrounds the arm 38 and is secured to it by means of a pin 115 extending through suitable openings in both member 113 and arm 38 to locate the lift shoe 40 which in this case is secured at the bottom of extension member 113. It will be appreciated that by providing one or more additional openings, as at 127, through the arm 38, for pin 115, that it is possible to adjust member 113 and the lift shoe 40 at the bottom thereof to accommodate loads of varying height.

Figure 14:
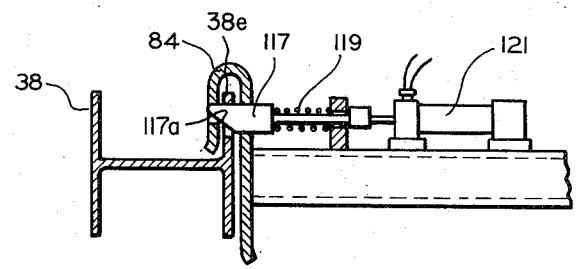
FIG. 14 is a more detailed view of one of the latch mechanisms for holding a lift arm.

FIG. 14 illustrates a typical latch mechanism for use in latching arm 38 to its respective hanger 84. A detent 117 is provided which extends through aligned openings in the curved downwardly facing bracket 84 and an opening 117a (see FIG. 13) in the inner flange of arm 38 (which is shown in the raised position in FIG. 14) and when detent 117 is in the position indicated in FIG. 14, the arm 38 is latched, the detent 117 being held in place by means of a compression spring 119. Unlatching is accomplished in this typical case by means of a hydraulic actuator 121 which can be remotely actuated to retract the detent 117 to the right to accomplish unlatching. This actuator 121 is similar to actuator 70 described previously, with one of the latch members 68 of the previously described mechanism corresponding to detent 117; the principal difference is that the present device is single acting instead of double acting, that is, instead of being moved by hydraulic pressure in both directions it is moved by hydraulic pressure in the unlatching direction only and is restored automatically to the other condition by the force of compression spring 119 when hydraulic pressure is removed. It will be appreciated that latching will occur again automatically when the upper inside flange of the arm 38 is raised within the U-shaped portion at the top of bracket 84 to the position shown in FIG. 14. This occurs because as the upper edge 38e of the arm, when it is below detent 117 and is being raised upwardly, contacts the slanted cam surface 117a of the detent and the resulting force includes a component which moves detent 117 to the right against the pressure of spring 119 and allows arm 38 to move upwardly to the position of FIG. 14 and the detent 117 then to be restored by spring 119 to the position shown in FIG. 14.

It will be understood that in the claims it is necessary in order to specify adequately the scope of the present invention to state that certain parts are located in particular positions in certain circumstances, such as the main boom arms being in a horizontally disposed position in the collapsed condition of the load handling machine even though such boom arms occupy other positions during the operation of the load handling machine. It should be further understood that it is not intended to limit the scope of the claims by the use of such terminology.

While I have disclosed and described herein a preferred embodiment of my invention, it will be understood that modifications may be made, and I intend to cover by the appended claims all such modifications which fall within the true spirit and scope of my invention.

I claim:

1. A load handling apparatus comprising an elongated beam member, a pair of carriages carried by the said beam member, each carriage including a transverse tube defining a transverse axis, two pairs of coaxial telescopic tubular members located one pair in each said transverse tube and projecting from the respective ends thereof, means connected respectively between each said carriage and each said telescopic tubular member embodied therein for pivoting the said telescopic tubular members about the said axis, means including an axially movable connection between each said telescopic tubular member and its respective pivoting means for moving the said tubular members outwardly and inwardly without pivoting movement of the telescopic tubular members about the said axis, and load lift arms connected at the outer ends of the said tubular members, respectively.

2. A load handling apparatus as specified in claim 1 in which each of the said carriages includes a pair of support brackets arranged so that the respective load lift arms engage the said brackets respectively in one condition of the load handling apparatus.

3. A load handling apparatus as specified in claim 2 in which the said load lift arms are releasably latched to their respective brackets.

4. A load handling apparatus as specified in claim 3 in which the said carriages are both movably mounted on the said beam member, and means are provided for adjustably positioning the said carriages on the beam member.

5. A load handling apparatus as specified in claim 1 in which each of the lift arms includes a container handling fitting detachably connected thereto, the said fittings being arranged so that they engage side openings in a cargo container to be lifted as the load lift arms are moved toward each other.

6. A load handling apparatus as specified in claim 4 in which each of the lift arms includes a hook portion adjacent its pivot axis, the said hook portions being arranged so that they engage end openings in a cargo container to be lifted as the said carriages are moved toward each other.

7. A load handling apparatus as specified in claim 1 in which the said load lift arms have adjustable lift shoes, pivotable laterally outwardly, at the outer ends thereof.

8. A load handling device comprising a support structure including a transverse tube defining a transverse axis, a pair of telescopic tubular members projecting from the opposite ends of the said transverse tube, means connected between the said support structure and the said telescopic tubular members respectively for pivoting the said telescopic tubular members about the said axis, means including an axially movable connection between each said telescopic tubular member and said pivoting means for moving the said telescopic tubular members outwardly and inwardly without pivoting movement of the telescopic tubular members about the said axis, and load lift arms connected at the outer ends of the said telescopic tubular members.

9. A load handling device as specified in claim 8 in which the said support structure includes a pair of support brackets located one on each side and arranged so that the said load lift arms engage the said brackets respectively in one condition of the load handling device.

10. A load handling device as specified in claim 9 in which the said load lift arms are releasably latched to their respective brackets.

11. A load handling device as specified in claim 10 in which the said support structure is movably mounted on a beam member, and means are provided for adjustably positioning the said support structure longitudinally on the said beam member.

12. A load handling device as specified in claim 8 in which the said last-named means includes for each said telescopic tubular member an elongated slot in the telescopic tubular member parallel to the said axis, a muff surrounding the said transverse tube and movable circumferentially relative to the transverse tube, a cutout portion in the said transverse tube, and a key member carried by each said muff and extending through said cutout portion into the said slot in the respective telescopic tubular member.

* * * * *